United States Patent [19]

Watkins

[11] Patent Number: 4,674,584

[45] Date of Patent: Jun. 23, 1987

[54] STAIR-CLIMBING WHEELCHAIR WITH STAIR STEP SENSING MEANS

[75] Inventor: Baxter R. Watkins, Foster City, Calif.

[73] Assignee: Gordon W. Rosenberg, San Ardo, Calif.

[21] Appl. No.: 782,741

[22] Filed: Oct. 1, 1985

[51] Int. Cl.[4] .......................... B62B 5/02; B62B 9/02

[52] U.S. Cl. .................................. 180/8.2; 180/9.22; 180/9.28; 180/907; 280/5.22; 280/DIG. 10

[58] Field of Search .................. 180/8.1, 8.2, 8.3, 8.4, 180/8.7, 9, 9.1, 9.21, 9.22, 9.26, 9.28, 9.3, 9.32, 9.34, 9.36, 9.62, 907, 169; 280/5.2, 5.22, 5.28, 5.32, 707, DIG. 10; 297/DIG. 4, 297

[56] References Cited

U.S. PATENT DOCUMENTS

| | | | |
|---|---|---|---|
| 3,133,742 | 5/1964 | Richison et al. | 297/45 X |
| 3,625,303 | 12/1971 | Cameron | 180/169 |
| 4,513,833 | 4/1985 | Sheldon | 180/9.1 |
| 4,564,080 | 1/1986 | Pagett | 180/9.28 X |
| 4,566,707 | 1/1986 | Nitzberg | 180/8.2 |

*Primary Examiner*—John J. Love
*Assistant Examiner*—Mitchell J. Hill
*Attorney, Agent, or Firm*—Townsend and Townsend

[57] ABSTRACT

A stair-climbing wheelchair having a sensor at the front end thereof for sensing the presence of a stair step or an inclined ramp. The sensor emits signals which reflect from a surface and to a receptor in the sensor, the receptor being coupled to a microprocessor which determines not only the linear distance traveled by the wheelchair in a forward direction, but also the height of a stair step. Thus, when the tracks are down, a microprocessor associated with the sensor will shut off the drive motors to the tracks if the slope of the stairway is too great when the tracks are down. In such a case, the wheelchair backs away from the stairway and does not go down it. If the slope is less than a predetermined value, such as 30°-35°, the wheelchair can move down the stairway in the normal fashion.

4 Claims, 7 Drawing Figures

STAIR-CLIMBING WHEELCHAIR WITH STAIR STEP SENSING MEANS

This invention relates to improvements in wheelchairs and similar movable objects and, more particularly, to a stair-climbing wheelchair having means for sensing the presence and height of stair steps before the wheelchair moves from a horizontal position to an inclined position.

BACKGROUND OF THE INVENTION

An improved wheelchair for climbing stairs and inclined ramps has been described in U.S. patent application Ser. No. 461,654, filed Jan. 27, 1983, now U.S. Pat. No. 4,564,080. The wheelchair in this disclosure includes a number of features which permit a wheelchair or similar conveyance to change from a first wheel base comprised of ground-engaging wheels to a second wheel base comprised of a pair of endless, flexible track when the wheelchair is to be moved up or down an inclined path. The wheels and tracks are motor-driven and a suitable control is provided to allow for forward and reverse movements of the wheelchair and turning movements of the wheelchair.

It has been found that, with a wheelchair of the type described, it is imperative that the wheelchair not go down a stairway or inclined path with the wheels down or go down a stairway which is too steep in slope even when the tracks are down. Thus, a need exists for improvements in a stair-climbing wheelchair to prevent these problems from occurring. The present invention satisfies this need.

SUMMARY OF THE INVENTION

This invention is directed to a wheelchair of the type described which has stair-height sensing means thereon at the front end of the wheelchair so that, as the wheelchair moves along a horizontal path toward a stairway or an inclined path, the wheelchair is stopped before it moves into an inclined position if the wheels are down and the tracks are up, or if the inclined path or stairway is too steep when the tracks are down.

The primary object of the present invention is to provide a stair-climbing wheelchair having means thereon to sense certain features of a stairway as the wheelchair approaches the stairway and to stop the wheelchair quickly if the wheels are down or the slope of the stairway is too great to thereby provide a safety feature for the wheelchair.

Other objects of this invention will become apparent as the following specification progresses, reference being had to the accompanying drawings for an illustration of the invention.

Figure 1:
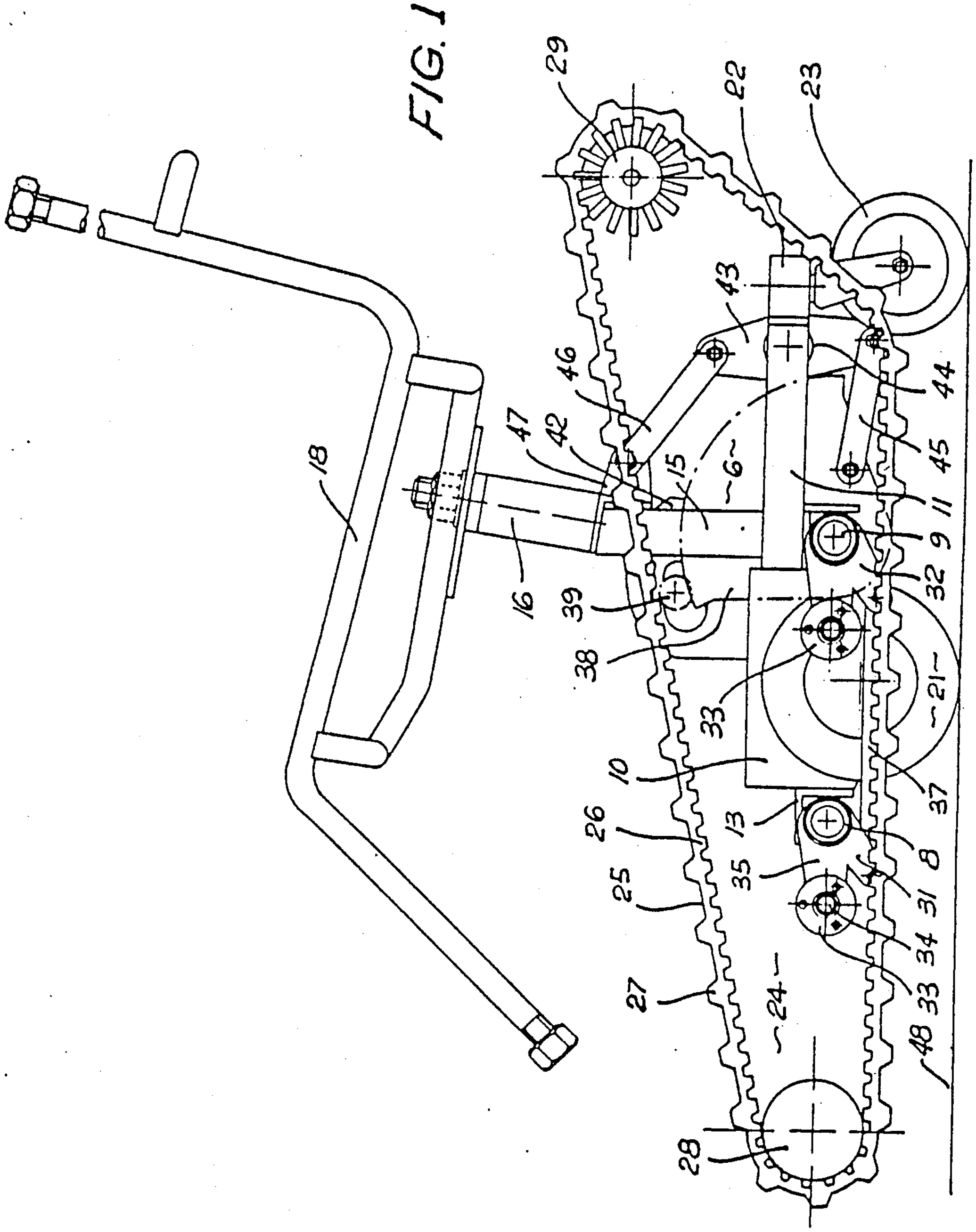
FIG. 1 is a side elevational view of the wheelchair of the present invention.

Referring to the drawings, the wheelchair of the present invention includes a chassis frame having side rails 6, center rail 7 and transverse shafts 8 and 9. Each side rail 6 includes a support plate portion 10 rigidly fixed to a rod portion 11. Center rail 7 extends only between shafts 8 and 9 mainly to act as a steadying influence on the frame to counteract lateral flexibility of plate portions 10 owing to their thinness. The rails 6 and 7 are furnished with bearing sleeves 12 fixed on the rails by way of angle members 13. Shafts 8 and 9 are rotatable within sleeves 12 and are restrained against endwise movement relative thereto by collars 14.

The upright support column consists of a yoke 15 and stem 16 fixed to the yoke. The lower end of the support column is thus in two parts, each of which is pivotally mounted on shaft 9 by way of bearing sleeves 17. The upper end of the support column is furnished with any suitable means for mounting a load carrier or chair 18 thereon.

Support plates 10 each carry an electric motor 19 having a stub drive shaft 20 with a front road wheel 21 keyed on it. The motors are powered by a battery carried on the wheelchair. Conventional controls (not shown) are provided so that the motors may be operated together in forward or reverse, or individually or oppositely for steering purposes. The rear ends of rod portions 11 carry vertical axis sleeves 22 for caster-type rear road wheels 23. Wheels 21 and 23 provide the conveyance with a first wheel base, being that wheel base which is effective during level floor travel of the conveyance, as indicated in FIG. 1.

Mounting plates 24 are placed at the sides of the chassis frame and both of them are closely and respectively encompassed by flexible crawler belts 25, having internal gear teeth 26 and external tread cleats 27. Belts 25 run about conventional idler pulleys freely rotatably mounted on plates 24. Two of these idler pulleys are indicated at 28. Belts 25 are separately or combinedly operable by drive pinions 29 each of which has its own motor 30 mounted on the associated mounting plate 24. Motors 30 are controllable in the same way as previously explained in connection with motors 19.

The mounting plates 24 are operatively connected to the chassis frame by way of front and rear bell cranks 31 and 32, respectively, keyed on shafts 8 and 9 so that bell cranks 31 will necessarily act as a single entity and bell cranks 32 will rotate when shaft 9 rotates. Each of the mounting plates 24 has bearing blocks 33 fixed on its inner side and these receive pins 34 on the bell crank arms 35. The bell crank arms 36, at each side of the chassis frame, are coupled together by connecting rods 37.

Shaft 9 has a sector gear 38 keyed on it, and this gear is in mesh with a drive pinion 39 keyed on stub shaft 40 of a motor 41 mounted on plate 42 fixedly mounted on frame member 7. A transmission lever 43 is fulcrumed at 44 between frame members 11. One arm of lever 43 is coupled to sector gear 38 by link 45, and the other arm of lever 43 is coupled, by link 46, to a lug 47 fixed on column 15/16.

As already stated the wheelchair as shown in FIG. 1 is conditioned for travel on the level; that is, with crawler belts 25 elevated above floor level 48.

Figure 2:
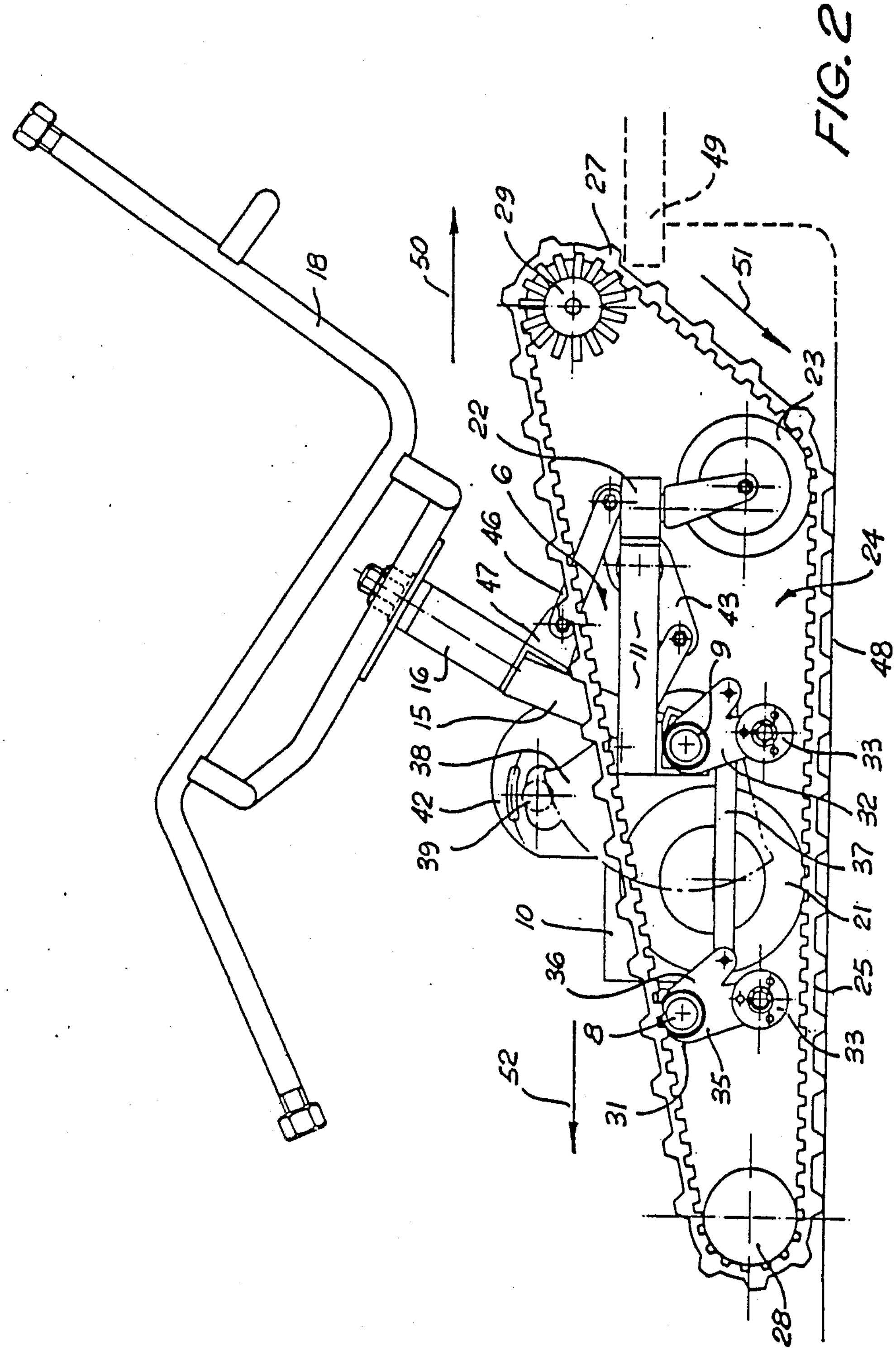
FIG. 2 is a view similar to FIG. 1 except for showing the wheelchair conditioned for up- or down-travel.
Figure 3:
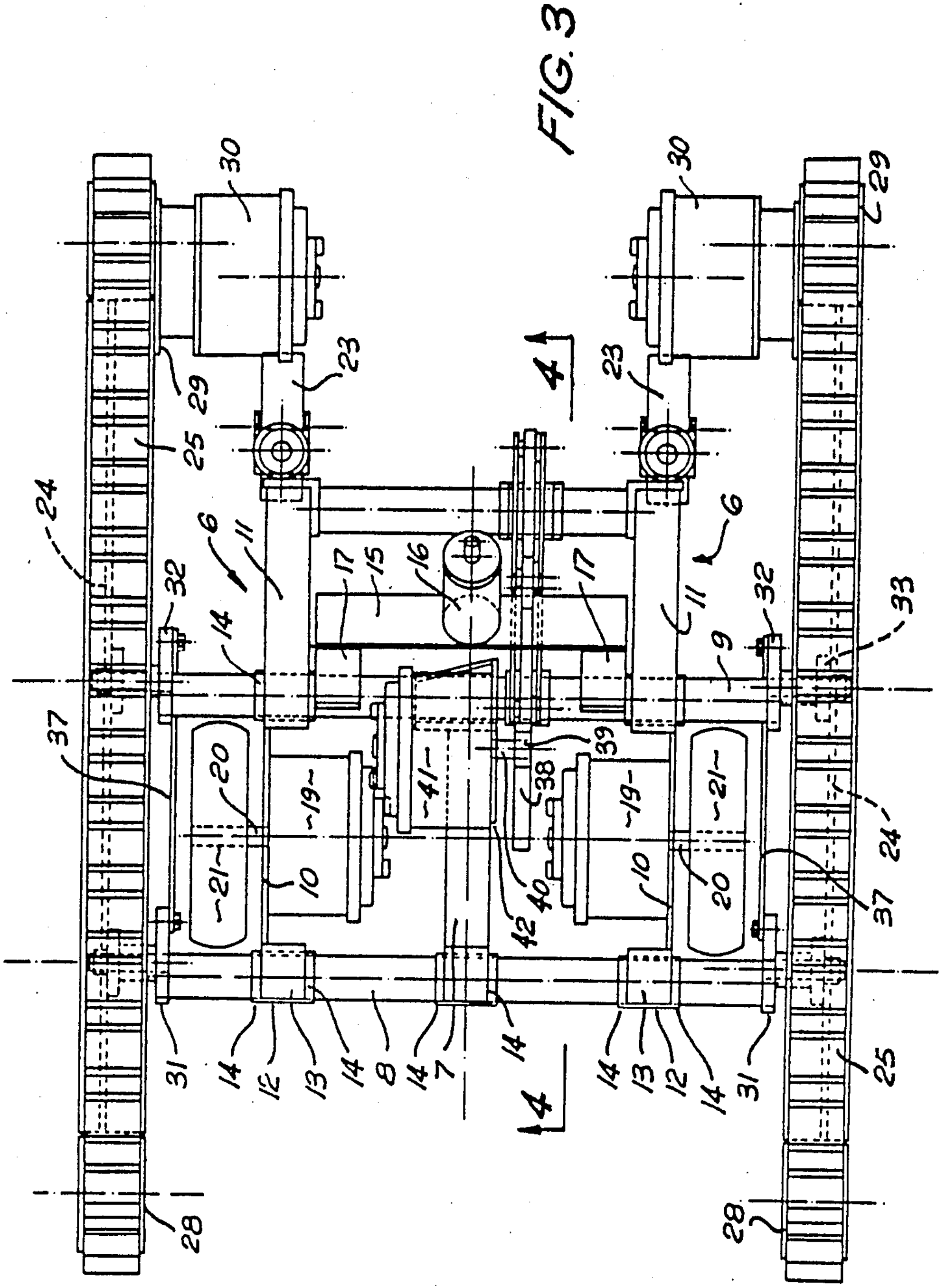
FIG. 3 is a plan view of the wheelchair drive mechanism.
Figure 4:
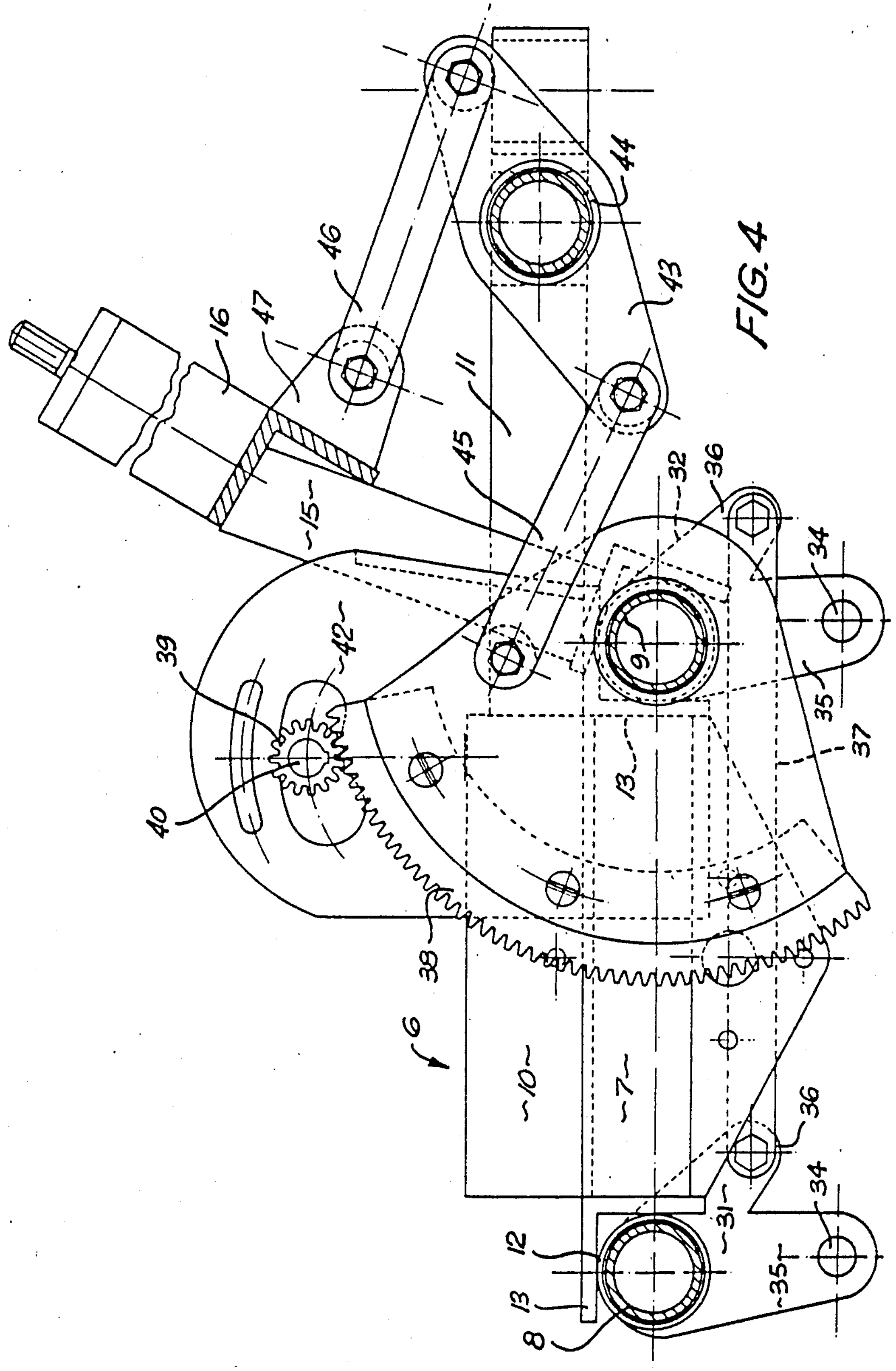
FIG. 4 is a vertical section, on an enlarged scale, taken on line 4—4 of FIG. 3.
Figure 5:
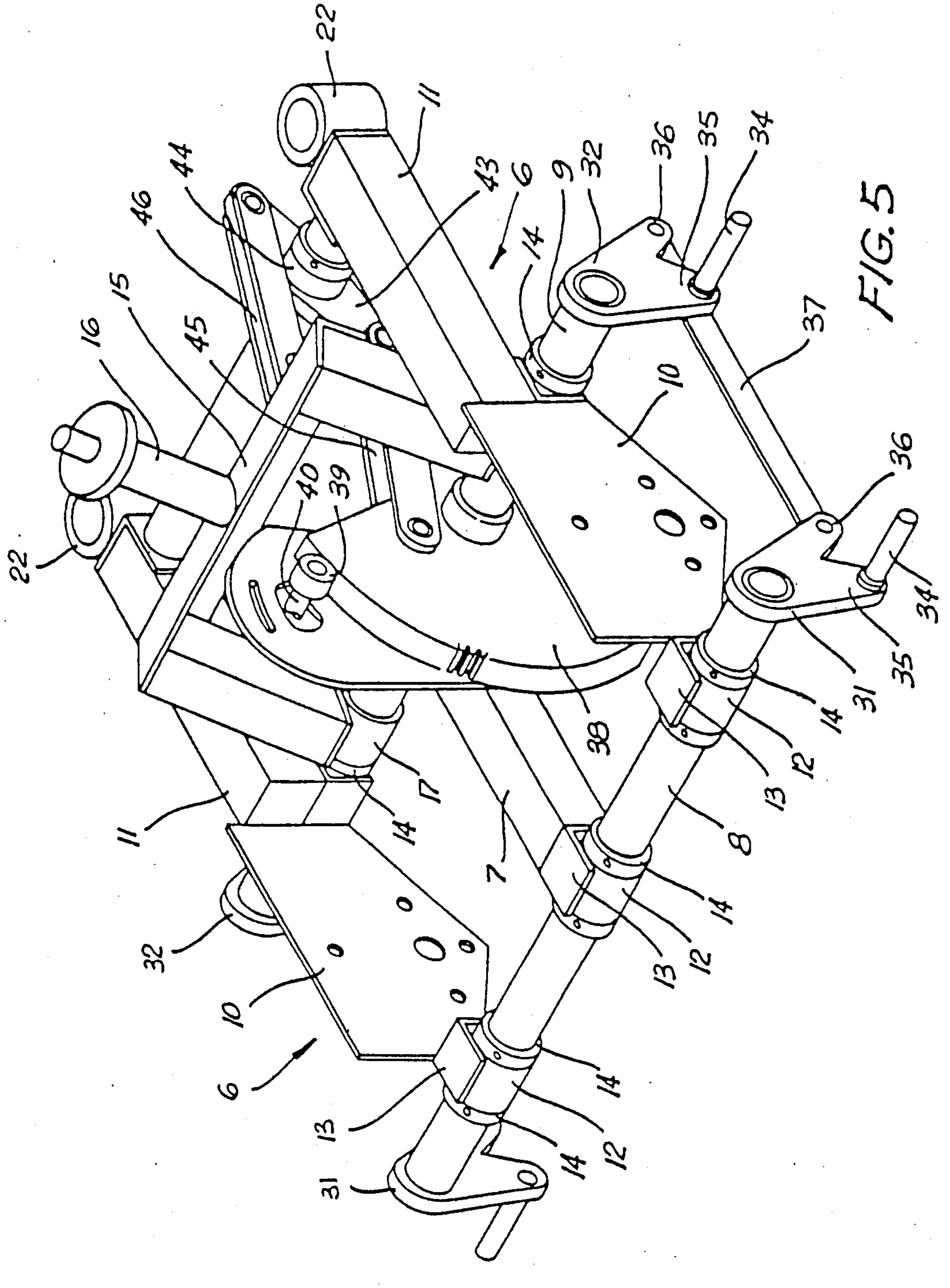
FIG. 5 is a perspective showing of some of the parts already shown in the earlier figures.

When a step 49 (FIG. 2), or a flight of stairs, is to be climbed, it is approached in the direction indicated by arrow 50 (FIG. 2). Just prior to arrival at the rise, motor 41 is energized so that the sector gear 38 is turned from the position shown for it in FIG. 1 to that shown in FIG. 2 thus acting through shaft 9 and bell cranks 31 and 32, lowering crawler belts 25 to floor level and elevating wheels 21 and 23 clear of that level. In this way the bottom flights of belts 25 become effective as another wheel base. During the wheel base change-over, the column 15/16 is swung about is pivot mount on shaft 9, through the agency of lever 43 and links 45 and 46, from its position shown in FIG. 1 to that shown in FIG. 2 so that the orientation of the load carrier or chair 18 is better suited to the climb, and at the same time the vertical axis of the center of gravity of the load carrier plus its load remain well within the lateral ambit of the second wheel base.

During the approach to the rise, the belts 25 are moving in the direction indicated by arrow 51 in FIG. 2 so that when stair contact is made the cleats 27 ensure performance of the climb. When a descent is to be made the same procedure is followed except that the descent is approached in the direction indicated by arrow 52 in FIG. 2.

The pinion 39 which causes rotation of the sector gear 38 to effect a wheel base change-over is preferably motor-driven by motor 41. The shaft 40 on which pinion 39 is mounted could carry a worm wheel meshed by a worm on a shaft manually rotatable by a hand-wheel or the like.

Figure 6:
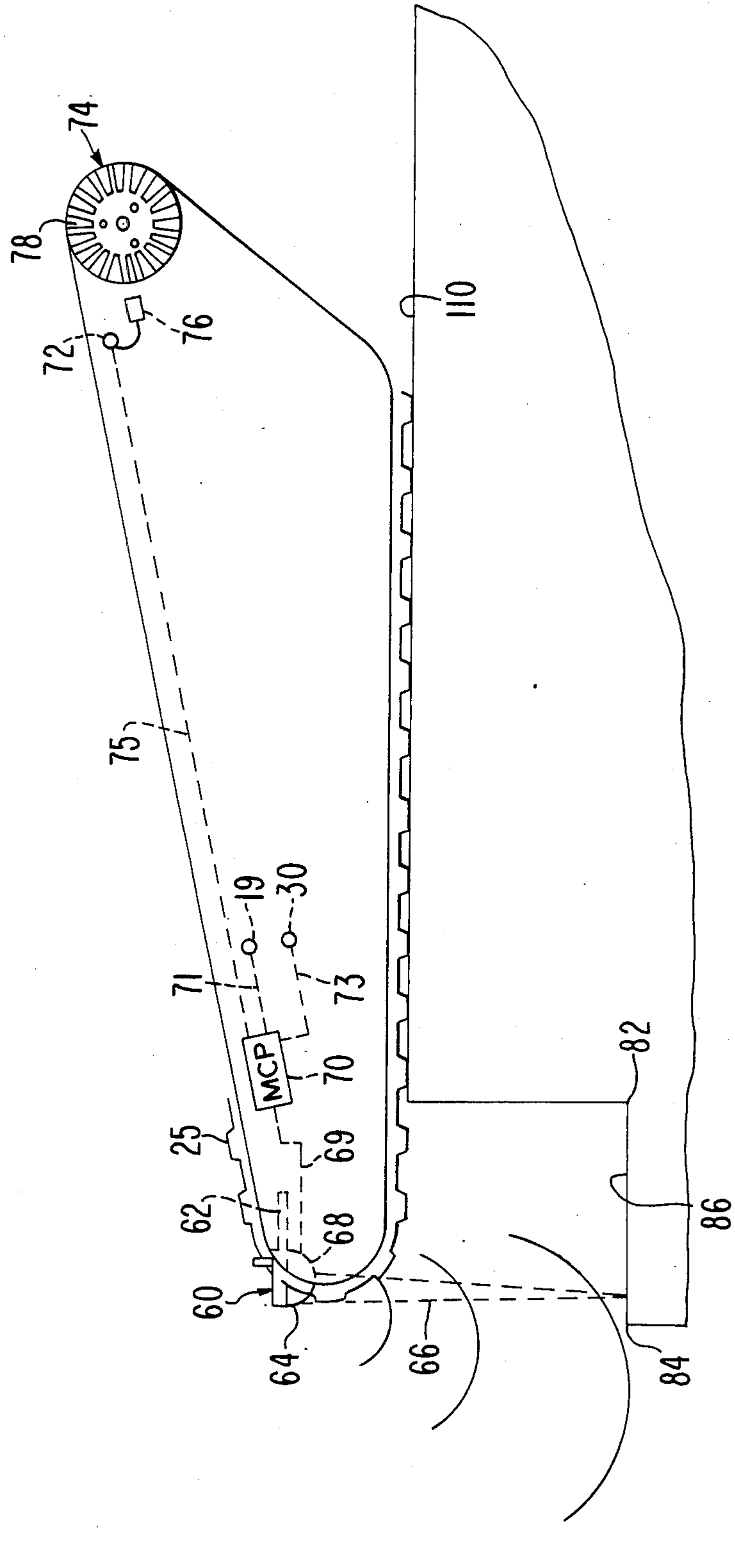
FIG. 6 is a schematic side elevational view of the wheelchair on a horizontal path and showing the sensing means thereof.
Figure 7:
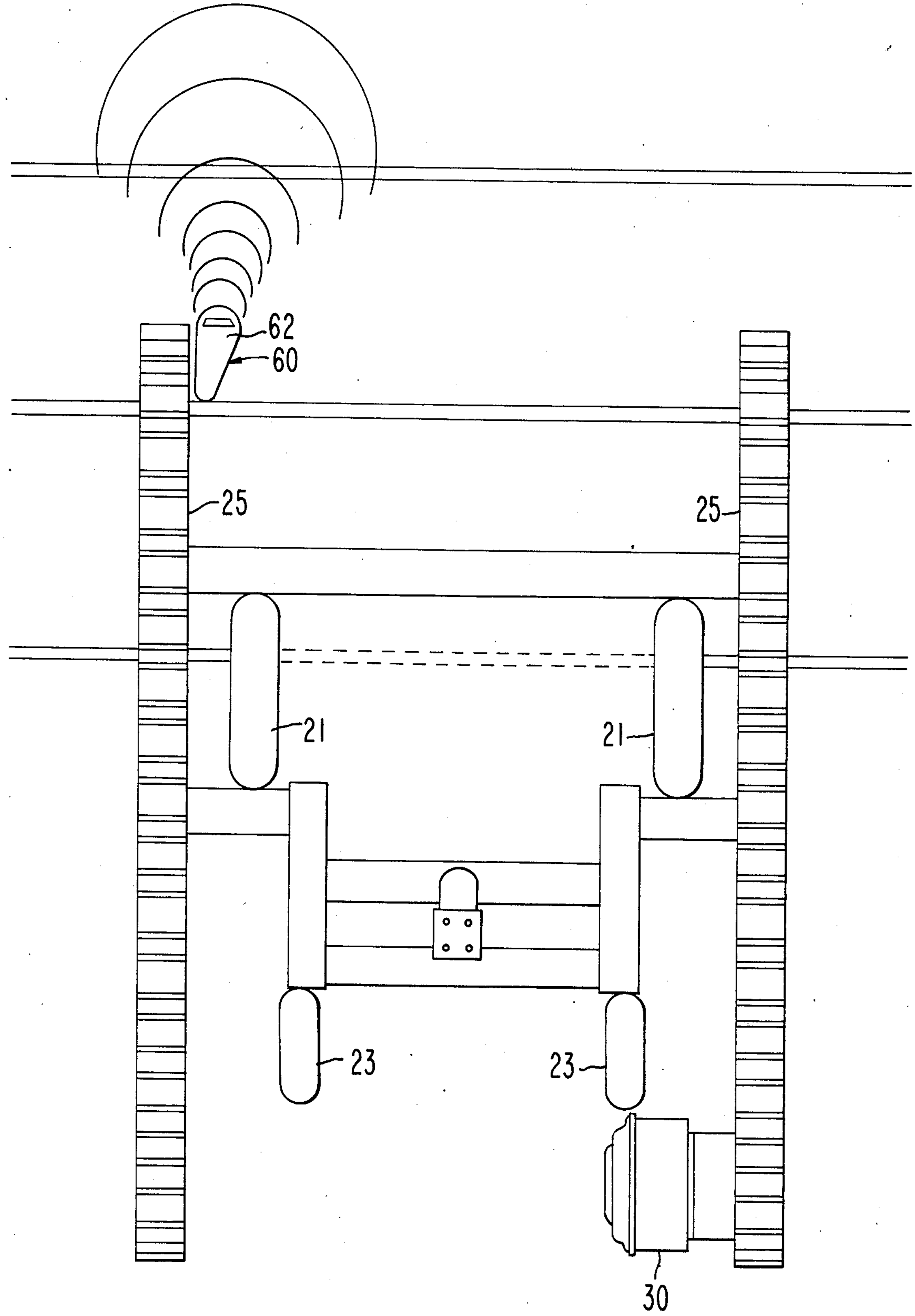
FIG. 7 is a top plan view of the wheelchair in schematic form, showing the location of the sensing means near the front end of the wheelchair.

As shown in FIG. 6, a position sensor 60 is near one of the tracks 25 thereof. Sensor 60 has a sensor body 62 mounted, for instance, on the side plate of the corresponding track 25. The sensor includes a signal generator 64 which sends out a signal 66 which engages the upper surface 96 of a stair step near the top of a stairway having a landing 110. The sensor further has a signal receptor 68 which is coupled by a line 69 to a microprocessor 70 having terminals coupled by lines 71 and 73 to motors 19 and motors 30 respectively. The microprocessor 70 is also provided with a terminal coupled by a lead 75 to a counter 72 having a photocell sensor 76 which receives light reflections from the teeth 78 of a sprocket 74 adapted to engage the track 25 and move the track in a particular direction.

In use, the sensor sends out an ultrasonic signal along line 66 and any reflections from flat, horizontal surfaces, such as the upper surface of step 86 is received by a receptor 68 which, in turn, sends a signal along line 69 to the microprocessor 70. The microprocessor is programmed to remove voltage from and thereby to shut all motors 19 and 30 completely off if the wheels of the wheelchair are down and the tracks are up for any distance vertically from signal generator 64 and receptor 68 greater than five inches. Thus, when the wheels are down and the wheelchair commences to go over the upper edge 88 of landing 110 as shown in FIG. 6, the sensor 60 sends a signal to the microprocessor and the microprocessor causes voltage to be removed from the drive motors 19 and 30 and the wheelchair is stopped immediately. However, the microprocessor is programmed to allow the motors to operate to reverse the movement of the wheelchair away from the stairway.

If the tracks are down, the sensor and microprocessor cooperate in a manner to determine if the stairway is too steep for safety purposes. This is achieved by having sensor 60 generate ultrasonic signals which pass along line 66 (FIG. 6) to the upper step 86. Once this commences, counter 72 counts the number of teeth 78 on sprocket 74 so as to determine the linear distance traveled in a horizontal direction. This, in effect, will provide a determination of the distance between point 82 and point 84 on the upper step 86 of the stairway. The microprocessor will also determine the height of the step, such as the distance between points 82 and 88 of the step and the microprocessor having the information about the distance traveled in a horizontal direction and having the stair step height, will determine if the slope or inclination, i.e., the distance between points 84 and 88 of the upper stair step, is too steep. If it is too steep, the microprocessor stops motors 19 and 30 completely and the wheelchair can go no longer forwardly. However, the microprocessor allows the motors to operate in the reverse direction so that the wheelchair can move rearwardly away from the stairway. If, on the other hand, the stairway slope is below a certain value, such as 30°-35°, then the wheelchair will proceed down the stairway in the usual fashion.

I claim:

1. Mobile apparatus comprising:

a central support;

a pair of side supports on respective sides of the central support;

means pivotally mounting the central support on each side support, respectively, said mounting means allowing the central support and each side support to move relative to each other;

means coupled with the supports for moving the side supports relative to the central support;

wheel means coupled to the central support for moving the same over a surface;

means carried by the central support for driving said wheel means;

an endless flexible track for each side support, respectively, each track being mounted on the side support for movement over a surface;

means coupled with each track, respectively, for moving the track relative to the respective side supports, the supports and tracks being operable for movement along a horizontal path and along an inclined path; and means for sensing the height of an inclined path and for stopping the forward movement of the supports if said path height is greater than a pre-selected base value.

2. Apparatus as set forth in claim 1, wherein the sensing means includes an ultrasonic sensor and a microprocessor.

3. Apparatus as set forth in claim 2, wherein said microprocessor is coupled to said wheel driving means for deactuating the latter if the wheels are in engagement with a surface.

4. Apparatus as set forth in claim 2, wherein said microprocessor is coupled with said track moving means for deactuating the latter if the slope of said inclined path is greater than a pre-selected reference value.

* * * * *